United States Patent [19]

Ramsey, Jr.

[11] Patent Number: 4,549,845

[45] Date of Patent: Oct. 29, 1985

[54] METHOD AND APPARATUS FOR HANDLING DRUMS

[75] Inventor: Robert W. Ramsey, Jr., Brookfield Center, Conn.

[73] Assignee: Automation Industries, Inc., Greenwich, Conn.

[21] Appl. No.: 526,443

[22] Filed: Aug. 25, 1983

[51] Int. Cl.[4] .......................... B65G 7/02; B66F 9/065; B66F 9/12

[52] U.S. Cl. ........................................ 414/620; 53/243; 53/473; 414/622; 414/680; 414/718; 414/728; 414/912

[58] Field of Search ............... 414/405, 420, 422, 620, 414/622, 672, 786, 912, 607, 495, 486, 555, 680, 718, 728; 53/243, 473

[56] References Cited

U.S. PATENT DOCUMENTS

| | | | |
|---|---|---|---|
| 2,875,912 | 3/1959 | Thresher et al. | 414/622 |
| 4,095,707 | 6/1978 | Kowtko | 414/405 |

*Primary Examiner*—Robert G. Sheridan
*Attorney, Agent, or Firm*—Thomas L. Flattery

[57] ABSTRACT

A method and apparatus for gently holding, lifting and rotating a drum which may contain hazardous waste and may be likely to rupture, characterized in that an open-ended overpack is lowered around the drum and held fixed in relation to the floor while a platform slides beneath the overpack and drum, the overpack then being clamped by a lid against the platform and then elevated and rotated so that the drum therewithin is disposed in an upside-down position.

19 Claims, 6 Drawing Figures

METHOD AND APPARATUS FOR HANDLING DRUMS

BACKGROUND OF THE INVENTION

In the disposal of hazardous waste such as radioactive materials, stringent precautions must be taken to guard against spilling or leaking of their containers. Typically, liquid or dry waste materials are stored in standard fifty-five gallon drums the walls of which often experience serious corrosion making them very susceptible to rupturing during handling. Manual handling of such drums can be dangerous to personnel, particularly with radioactive materials, and conventional remote control handling has proved unsatisfactory because of its reliance upon "crab claw" type devices which squeeze the drums about their midsection or between their ends. Such gripping devices entail a high risk of damaging the drums and causing their contents to spill.

It is one of the purposes of this invention to contain the object drum within a salvage overpack steel drum. Such overpacks, as they are hereinafter called, are heavy duty steel cylinders which may contain a special liner resistant to most hazardous materials. The overpacks are not themselves novel, except for a special gasket which may surround the run of their open end as described below, and neither are some of the individual elements of the apparatus of this invention. Thus self-loading vehicles designed to carry cylindrical tanks are taught in U.S. Pat. No. 2,808,948 and handling devices having a lower platform adapted to slide under a load and an upper lid to clamp the load vertically against the platform are shown in U.S. Pat. No. 2,682,347. However, the prior art neither anticipates nor suggests the overall combination of the drum handling method and apparatus described and claimed herein.

BRIEF STATEMENT OF THE INVENTION

The invention provides a method of handling a drum from a first location in an upright position on a floor to a rotated position supported above the floor. The first step of the method is the positioning of a carrier platform on the floor alongside the drum. An open-ended overpack is then lowered vertically over the drum at the first location. The platform is next moved towards the drum while the overpack is translated with respect to the platform so that the overpack and drum therewithin maintain their position on the floor at the first location and the platform slides under the overpack and drum. A lid is lowered downwardly to clamp the overpack against the platform. The platform and lid are then elevated with the clamped overpack therebetween. Finally the platform and lid with the clamped overpack therebetween are rotated.

The invention also provides apparatus for handling a drum from a first location in an upright position on a floor to a rotated inverted position supported above the floor. It includes a powered steerable vehicle and movable driven frame means on the vehicle adapted for vertical displacement with respect thereto. A carrier platform is rotatably mounted on the frame and disposable in a horizontal position adjacent to the floor alongside the drum so that it may slide over the floor and under the drum. Lifting arm means are included which are pivotable to and slidable along said frame. First motion coordinating means are provided which cause the pivotable and slidable end of the arm means to remain fixed with respect to the first drum location as the vehicle is moved toward that location. Support link means are included which are longitudinally slidable on the opposite end of the lifting arm means. Drive means are also provided for translating the arm and link means into selected positions with respect to the frame and to one another. An open-ended overpack supported vertically by the link means is adapted to be lowered over the drum. On each side of the overpack detachable connector means are included for attachment to the link means at selected positions both above and below the horizontal centerline of the overpack. A lid is movable on the frame toward and away from the platform for clamping the overpack therebetween. Second motion coordinating means are provided for causing the overpack to move in a vertical path as the lifting arms are pivoted downwardly. By the foregoing structure the overpack can be lowered vertically over the drum by pivoting the arm and link means and can then be held fixed in relation to the first drum location as the carrier platform is caused to slide under the overpack by forward motion of the vehicle toward the drum, whereupon the lid can be lowered to clamp the overpack so that upon detachment of the link means the overpack and drum therewithin can be lifted and then rotated.

DESCRIPTION OF PREFERRED EMBODIMENT

Figure 1:
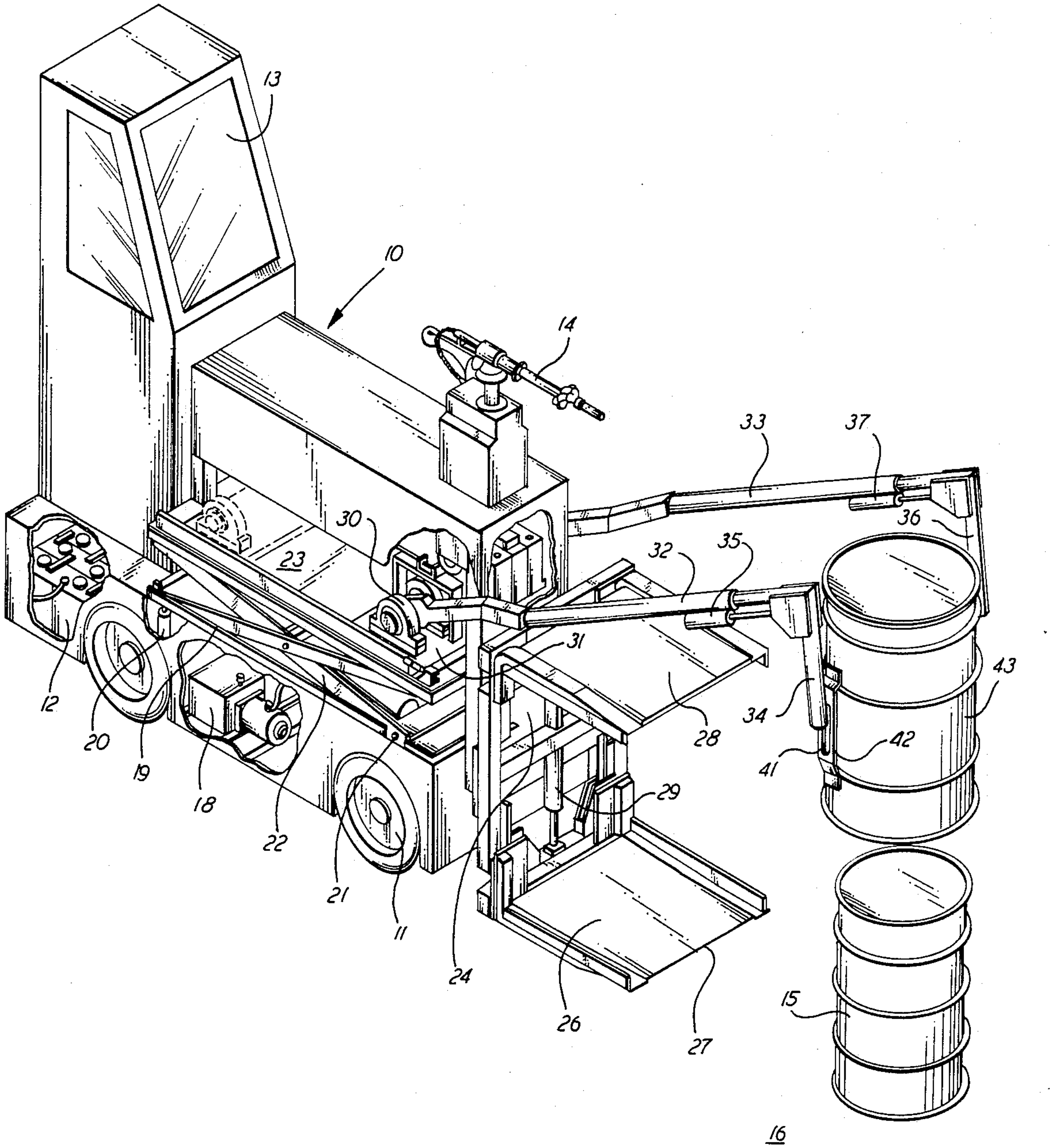
FIG. 1 is a pictorial view partly broken away showing the apparatus of the invention in its initial relation to an object drum.

Referring first to FIG. 1 the drum handling apparatus of the invention includes a vehicle 10 having four rubber tired wheels 11 and powered electrically from storage batteries 12 or from an external source linked by cables. A steering mechanism (not shown) is provided for the wheels 11 of the vehicle 10. It and the other controls described below may be operated from a personnel cab 13 or by remote control. In many instances, and certainly in the handling of radioactive waste, the vehcile 10 will indeed be adapted to remote operation and to this end a closed circuit television camera 14 may be mounted thereon for a clear view of the working area in front of the vehicle.

A typical fifty-five gallon drum 15 is shown in FIG. 1 in a free-standing upright position on a floor 16. In a nuclear power plant facility there may be many of such drums stored in vaults from which they must periodically be removed for transport to suitable permanent disposal sites. The apparatus and method of this invention find particular application in such vaults for picking up each drum in turn and carrying it to some means for long distance transport. It is not uncommon that such drums are seriously corroded after prolonged vault storage and the walls thereof weakened to the extent that rupture and leakage will occur if they are not handled with great gentleness. Such corrosion is found to be more severe at the lower ends of the drums when they have been standing upright in storage for long periods of time and for this reason, it is best to rotate the drums 180° to an inverted position while they are being moved about. This relieves the weakened lower ends of the drums of the weight of the contents during handling. Conventional crab claw handling devices impose squeezing forces on the object drum which can very well cause damage and spilling of the hazardous contents. The purpose of the present invention is to pick up each drum and turn it on its side with the least possible force imposed on its walls.

It will be understood from the following description that a number of different drive devices are included in the apparatus of the invention. These may be hydraulic and hence a central hydraulic power pack 18 may be provided within the vehicle 10, or they may be electromechanical. A movable driven frame 19 is mounted on the vehicle and is adapted for independent displacement in two modes. First by means of a hydraulic tilting cylinder 20, that end of the frame 19 closest to the cab 13 can be raised or lowered while it pivots about the other end 21. Also the frame 19 includes a scissors linkage 22 operated through hydraulic cylinders, not shown in the drawings, by which an upper section 23 of the frame can be raised or lowered.

Extending from the forward end of the frame 19 is a rotator 24 rotatable about the longitudinal axis of the vehicle. It will be understood, therefore, that the upper section 23 of the frame may be raised and lowered, the forward rotator 24 may be turned about its axis on the frame, and all of these elements may be tilted forwardly by the mechanism 20 or tilted back to the horizontal position shown in FIG. 1.

Supported by the rotator 24 and extending forwardly from the vehicle 10 is a carrier platform 26. It includes a thin entry knife edge 27 at its forwardmost portion and this entry edge may be tilted downwardly into contact with the floor 16 when the tilting cylinder 20 is operated. Also supported by the rotator 24 is a lid 28 which is movable toward and away from the platform 26 by means of a hydraulic piston 29.

Figure 6:
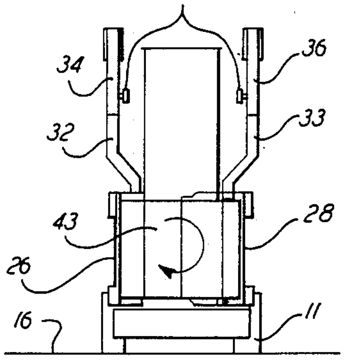
FIG. 6 is a schematic end elevation showing the overpack and drum being rotated through a horizontal position toward an upside-down position.

Bearings 30 (one shown) are mounted on a slide 31 which can be translated on the frame section 23 from the position shown in solid lines in FIG. 1 to as retracted position shown in dotted lines. Suitable hydraulic actuators are provided for the purpose but they are not shown in the drawings. Pivoted in these bearings 30 are side-by-side lifting arms 32 and 33. At the outer end of the arm 32 is a slidable right-angle support link 34 which can be moved in and out longitudinally relative to the arm 32 by a hydraulic piston 35. Similarly, at the outer end of the arm 33 is a slidable right-angle support link 36 which can be extended to various positions on the arm 33 by a hydraulic piston 37. As shown in FIG. 6 trunnions 40 extend from the outer ends of the supporting links 34 and 36. The trunnions 40 are slidable within slots 41 on brackets 42 fixed to the side of an otherwise standard overpack 43. Only one such bracket is visible in the drawings.

When the trunnions are at the upper ends of the slots they are above the horizontal centerline of the overpack and in that position permit the overpack to hang vertically under its own weight. When the trunnions are in the lower ends of the slots they are below the horizontal centerline of the overpack in an optimum position for causing relative horizontal sliding movement of the overpack. At the middle of the slot 41 between these upper and lower ends the bracket 42 is open so that when the trunnion 40 moves to that position it may be withdrawn by the action of the bracket 42 and disengaged entirely from the overpack 43. The same is true of the other trunnion and slot on the other side of the overpack.

Figure 2:
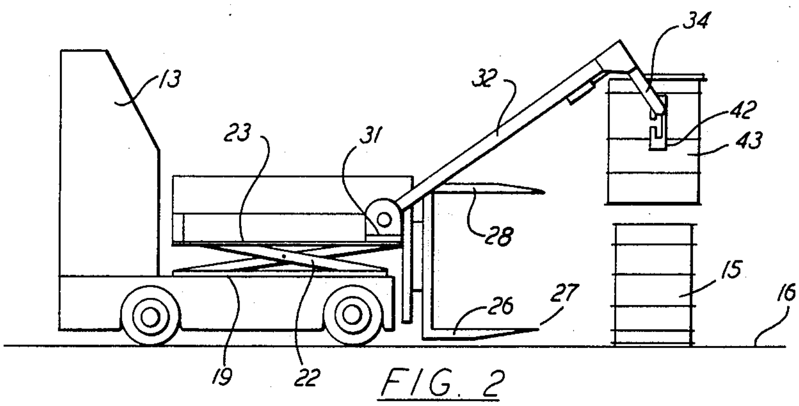
FIG. 2 is a schematic side elevation showing the initial position of the overpack being lowered over the drum.

In operation the drum 15 is in a free-standing upright position at a first location on the floor 16. The vehicle 10 is driven by remote control toward the drum 15 as viewed through the television camera 14 until it reaches a certain position spaced from the drum 15 as shown in FIGS. 1 and 2. By means of the scissors linkage 22 the upper section 23 of the frame 19 is at an elevated position at this time so that the vehicle can travel across the floor 16 with sufficient clearance for the carrier platform 26. The arms 32 and 33 and links 34 and 36 carry the overpack 43 in a suspended position with the trunnions 40 in the upper ends of the slots 41 in the brackets 42.

When the vehicle 10 reaches a certain predetermined position in relation to the drum 15, which can be sensed photoelectrically or by other suitable means, the vehicle is stopped and the overpack 43 is lowered downwardly over the object drum 15 as shown in FIG. 2. This lowering movement of the overpack is vertical translation along the axis of the drum 15 so that the overpack slides about the drum preferably without contacting it. Certain motion coordinating means are provided, such as programmed computer means, for causing the trunnions to move in a vertical path as the lifting arms are pivoted downwardly. The particular form of these coordinating means can vary and they are not shown in the drawings. It is enough to say that they are coordinating means which cause the cylinders 35 and 37 to extend and retract the arms 32 and 33 on the links 34 and 36, and which cause the slide 31 to move forwardly on the frame section 23 at the same time, with the result that the overpack 43 descends in a straight line. The frame 19 is then lowered so that the platform 26 is positioned just above the floor.

Figure 3:
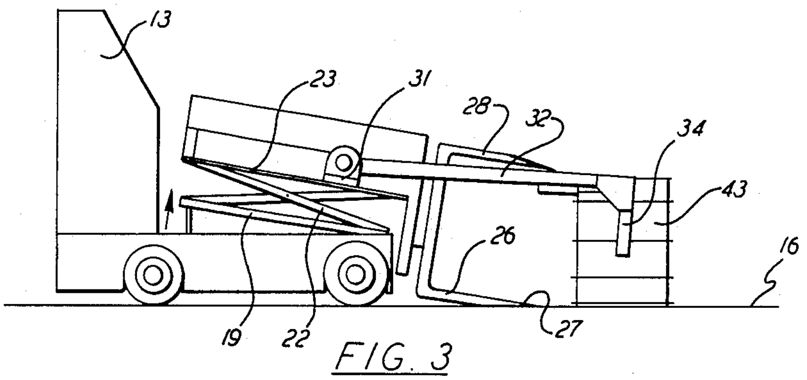
FIG. 3 is a schematic side elevation illustrating the platform about to slide under the drum.
Figure 4:
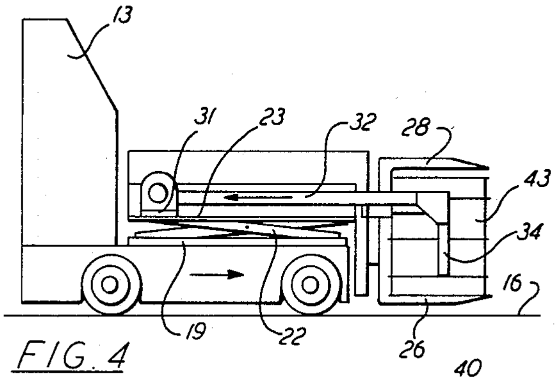
FIG. 4 is a schematic side elevation showing the platform supporting the overpack with the lid clamped in place.

Next the tilting cylinder 20 is operated to lift the end of the frame 19 remote from the drum 15 as shown by the arrow in FIG. 3 so as to tilt the platform 26. The outer knife edge 27 then touches the floor 16 as shown in FIG. 3. As shown in FIGS. 3 and 4, the ends of the arms 32 and 33 pivoted in the bearings 30 on the slide 31 which is translated to the left on the frame 19 while the vehicle is driven to the right closer to the drum 15. These movements are shown by arrows in FIG. 4. The overpack and drum therewithin thus maintain their position on the floor at the first location and the knife edge 27 and remainder of the platform 26 slide under the overpack and drum. During this relative movement the trunnions 40 are in the lowermost ends of the slots 41 of the brackets 42 to hold the overpack 43 in place beneath its horizontal centerline so that it does not tend to tip over.

Figure 5:
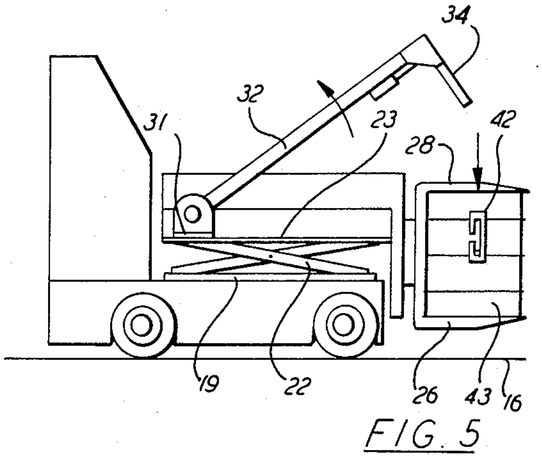
FIG. 5 is a schematic side elevation showing the arms swung clear of the overpack.

The tilting cylinder 20 is again actuated to tilt the frame 19 back to its horizontal position as shown in FIG. 4. The lid 28 is lowered as shown by an arrow in FIG. 5 by operation on hydraulic cylinder 29 in a downwardly direction onto the overpack without contacting the drum to clamp the overpack against the platform 26. A gasket of elastomeric material, preferably polytetrafluoretylene, may be located about open rim of the overpack 43 which is lowermost as seen in FIG. 1, to lubricate its sliding onto the platform 26 and to seal the overpack to the platform 26 when the force of the lid 28 is applied. The links 34 and 36 are translated such that the trunnions are freed of the brackets 42 through the central openings thereof and the arms are then pivoted upwardly to the position shown in FIG. 5 as shown by the curved arrows. The frame 19 is then elevated from the lowered position shown in FIG. 4 back to the slightly higher position shown in FIG. 5.

In the final step of the operation the rotator 24 is turned 180° so that the drum is turned upside-down. This rotation is shown by an arrow in FIG. 6 moving through the halfway horizontal position. The vehicle 10 is then driven by remote control to the next destination of the drum which may be transport means of some kind and any spilled contents are retained by the closed-end overpack. Unloading is carried out by a series of steps which are the reverse of those described above. Throughout all of this handling the drum 15 is never squeezed in crab claw fashion. It is enclosed in the overpack, lifted and then turned on its side with a minimum of force applied to its walls, thus ensuring to the greatest possible extent that no leakage occurs.

The foregoing embodiment of the apparatus and method are to be understood as a preferred form of the invention and the full scope of the invention is to be determined from the following claims.

I claim:

1. A method of handling a drum from a first location in an upright position on a floor to a rotated position supported above the floor which comprises
(a) positioning a carrier platform on the floor alongside the drum,
(b) lowering an open-ended overpack vertically over the drum at said first location,
(c) moving the platform toward the drum while translating the overpack with respect to the platform so that the overpack and drum therewithin maintain their position on the floor at said first location and the platform slides under the overpack and drum,
(d) lowering a lid downwardly onto said overpack to clamp the overpack against the platform,
(e) elevating the platform and lid with the clamped overpack therebetween, and
(f) rotating the platform and lid with the clamped overpack therebetween.

2. A method according to claim 1 wherein the carrier platform and overpack are movably mounted on a vehicle.

3. A method according to claim 2 wherein the carrier platform on the vehicle is initially disposed with an entry knife adjacent the floor alongside the drum, and the vehicle and platform are moved toward the drum so that the knife edge and remainder of the platform slide under the overpack and drum.

4. A method according to claim 3 wherein the carrier platform is tilted from the horizontal before the knife edge and remainder of the platform slides under the overpack and drum.

5. A method according to claim 4 wherein the platform and clamped overpack are tilted back to the horizontal before the platform is elevated.

6. A method according to claim 1 wherein the overpack is lowered over the drum without contacting the drum.

7. A method according to claim 1 wherein the overpack is held at a location above the horizontal centerline thereof as it is lowered vertically over the drum.

8. A method according to claim 1 wherein during movement of the platform toward the drum a force maintaining the overpack and drum at said first location is applied to the overpack beneath the horizontal centerline thereof.

9. A method of handling a drum from a first location in a free-standing upright position on a floor by means of a vehicle to a rotated upside-down position supported above the floor for movement to a second location which comprises
(a) positioning a carrier platform on the vehicle with an entry knife edge adjacent the floor alongside the drum,
(b) vertically lowering an open-ended overpack on the vehicle over the drum at said first location without contacting the drum,
(c) tilting the carrier platform from the horizontal so that its entry knife edge is on the floor,
(d) moving the vehicle and platform toward the drum while translating the overpack with respect to the vehicle so that the overpack and drum therewithin maintain their position on the floor at said first location and the knife edge and remainder of the platform slide under the overpack and drum,
(e) lowering a lid on the vehicle downwardly onto said overpack without contacting the drum to clamp the overpack against the platform,
(f) tilting the platform and clamped overpack back to the horizontal,
(g) elevating the platform and lid with the clamped overpack therebetween,
(h) rotating the platform and lid with the clamped overpack therebetween so that the drum therewithin is in an inverted upside-down position, and
(i) moving said vehicle supporting the elevated upside-down drum toward said second location.

10. A method according to claim 9 wherein the overpack is held at a location above the horizontal centerline thereof as it is lowered vertically over the drum.

11. A method according the claim 9 wherein during movement of the platform toward the drum a force maintaining the overpack and drum at said first location is applied to the overpack beneath the horizontal centerline thereof.

12. Apparatus for handling a drum from a first location in an upright position on a floor to a rotated position supported above the floor comprising
(a) a powered steerable vehicle,
(b) movable driven frame means on said vehicle adapted for vertical displacememt with respect to the vehicle,
(c) a carrier platform rotatably mounted on the frame and disposable in a horizontal position addjacent the floor alongside the drum so that it may slide over the floor and under the drum,
(d) lifting arm means pivoted at one end to and slidable along said frame,
(e) support link means longitudinally slidable on the opposite end of the lifting arm means,
(f) drive means for translating said arm and link means into selected positions with respect to the frame and to one another,
(g) an open-ended overpack supported vertically by said link means and adapted to be lowered over said drum, (h) detachable connector meeans on each side of said overpack for attachment to said link means at selected positions both above and below the horizontal centerline of the overpack, and (i) a link movable on said frame toward and away from said platform for clamping the overpack therebetween, (j) whereby the overpack can be lowered vertically over the drum by pivoting the arm and link means and can be held fixed in relation to the first drum location as the carrier platform is caused to slide under the overpack by forward motion of the vehicle toward the drum location as the carrier platform is caused to slide under the overpack by forward motion of the vehicle toward the drum whereupon the lid can be lowered to clamp the overpack so that upon detachment of the link means the overpack and the drum therewithin can be lifted and then rotated.

13. Apparatus according to claim 12 wherein the steerable vehicle is movable on wheels.

14. Apparatus accofding to claim 12 wherein the movable driven frame means is also adapted for independent tilting with respect to the vehicle.

15. Apparatus according to claim 14 wherein the carrier platform has an entry knife edge which slides under the drum and is tiltable from the horizontal while such sliding takes place.

16. Apparatus according to claim 12 wherein the lifting arm means are a pair of lifting arms and the support link means are a pair of support links.

17. Apparatus according to claim 12 wherein opposed trunnions are provided at the ends of the link means and the overpack is supported between said trunnions.

18. Apparatus according to claim 17 wherein the trunnions engage the overpack above the horizontal centerline thereof as the overpack is lowered over the drum and below the horizontal centerline thereof as the overpack is held at said first location and the carrier platform slides under the overpack.

19. Apparatus for handling a cylindrical drum from a first location in an upright position on a floor to a inverted upside-down position supported above the floor comprising (a) a powered steerable wheeled vehicle, (b) movable driven frame means on said vehicle adapted for vertical displacement and tilting with respect to the vehicle, (c) a carrier platform rotatably mounted on the frame and having an entry knife edge disposable in a horizontal position adjacent the floor alongside the drum and tiltable from that position so that the knife edge may slide over the floor and under the drum, (d) a pair of lifting arms pivoted at one end to and slidable along said frame at one of the arms, (e) a respective pair of support links longitudinally slidable on the opposite ends of the lifting arm, (f) drive means for translating said arms and links into selected positions with respect to the frame and to one another, (g) a pair of opposed trunnions at the respective ends of the links opposite the ends thereof pivoted to said arms.

(h) a cylindircal overpack open at one end and closed at the other and suported vertically between said trunnions and adapted to be lowered over and closely contain said drum, (i) detachable connector means on each side of said overpack for attachment to said trunnions at selected positions both above and below the horizontal centerline of the overpack, and (j) a lid movable on said frame toward and away from said platform for clamping the overpack therebetween, (k) whereby the overpack is lowered vertically over the drum by pivoting the arms and links and is held fixed in relation to the first drum location as the carrier platform is tilted and caused to slide under the overpack by forward motion of the overpack so that upon detachment of the trunnions the overpack and the drum therewithin can be lifted and then rotated to an inverted position so that the contained drum rests on the closed end of the overpack.

* * * * *